United States Patent
Harper et al.

(10) Patent No.: US 11,909,215 B2
(45) Date of Patent: Feb. 20, 2024

(54) TECHNOLOGIES FOR OPTIMIZING POWER GRIDS THROUGH DECENTRALIZED FORECASTING

(71) Applicant: Hitachi Energy Ltd, Zürich (CH)

(72) Inventors: Karl Eric Harper, Cary, NC (US); Mithun P. Acharya, Cary, NC (US); Karen J. Smiley, Raleigh, NC (US)

(73) Assignee: Hitachi Energy Ltd, Zürich (CH)

( * ) Notice: Subject to any disclaimer, the term of this patent is extended or adjusted under 35 U.S.C. 154(b) by 501 days.

(21) Appl. No.: 17/257,436

(22) PCT Filed: Jul. 5, 2019

(86) PCT No.: PCT/US2019/040719
§ 371 (c)(1),
(2) Date: Dec. 31, 2020

(87) PCT Pub. No.: WO2020/010326
PCT Pub. Date: Jan. 9, 2020

(65) Prior Publication Data
US 2021/0184471 A1 Jun. 17, 2021

Related U.S. Application Data

(60) Provisional application No. 62/694,431, filed on Jul. 5, 2018.

(51) Int. Cl.
*H02J 3/38* (2006.01)
*H02J 13/00* (2006.01)
(Continued)

(52) U.S. Cl.
CPC ............ *H02J 3/381* (2013.01); *G05B 13/027* (2013.01); *G05B 13/048* (2013.01);
(Continued)

(58) Field of Classification Search
CPC .............. H02J 3/381; H02J 13/00002; H02J 13/00022; H02J 2203/20; H02J 2300/20;
(Continued)

(56) References Cited

U.S. PATENT DOCUMENTS

| 8,103,389 B2 | 1/2012 | Golden et al. |
| 9,286,646 B1 | 3/2016 | Hoff |

(Continued)

FOREIGN PATENT DOCUMENTS

| CN | 102725933 A | 10/2012 |
| CN | 102891496 A | 1/2013 |

(Continued)

OTHER PUBLICATIONS

Dorsch, Nils, et al.; "Intertwined: Software-Defined Communication Networks for Multi-Agent System-based Smart Grid Control"; 2016 IEEE International Conference on Smart Grid Communications (SmartGridComm); Nov. 6-9, 2016, 6 pages.

(Continued)

*Primary Examiner* — Ziaul Karim
(74) *Attorney, Agent, or Firm* — Slater Matsil, LLP (57) ABSTRACT

A method of operating a computer device includes obtaining measurements of one or more conditions of a power grid component associated with the computer device. The computer device forecasts a future state of the one or more conditions of the power grid component associated with the computer device. The computer device communicates with other computer devices associated with other power grid components to negotiate a behavior of the power grid component associated with the computer device using the forecast.

32 Claims, 6 Drawing Sheets

(51) Int. Cl.
*G05B 13/02* (2006.01)
*G05B 13/04* (2006.01)

(52) U.S. Cl.
CPC .. *H02J 13/00002* (2020.01); *H02J 13/00022* (2020.01); *H02J 2203/20* (2020.01); *H02J 2300/20* (2020.01); *H02J 2310/12* (2020.01)

(58) Field of Classification Search
CPC ........ H02J 2310/12; H02J 3/004; H02J 3/003; G05B 13/027; G05B 13/048; Y04S 40/20; Y04S 10/123; Y04S 10/30; Y04S 10/50; Y04S 40/126; G06Q 10/063; G06Q 50/06; Y02E 40/70; Y02E 60/00; Y02P 80/20
See application file for complete search history.

(56) References Cited

U.S. PATENT DOCUMENTS

| | | | |
|---|---|---|---|
| 9,557,723 B2 | 1/2017 | Nasle | |
| 10,755,295 B2* | 8/2020 | Ilic | G06Q 50/06 |
| 11,703,903 B2* | 7/2023 | Forbes, Jr. | G05B 15/02 |
| | | | 700/297 |
| 2012/0323390 A1 | 12/2012 | Kobayasi | |
| 2013/0024034 A1 | 1/2013 | Iino et al. | |
| 2014/0379156 A1* | 12/2014 | Kamel | G01R 21/133 |
| | | | 700/291 |
| 2015/0012144 A1 | 1/2015 | Wang et al. | |
| 2015/0012146 A1 | 1/2015 | Cherian et al. | |
| 2015/0372488 A1 | 12/2015 | Maruhashi et al. | |
| 2016/0028275 A1* | 1/2016 | Kamel | H02J 13/00022 |
| | | | 700/295 |
| 2017/0227596 A1* | 8/2017 | Sozer | E04H 12/00 |
| 2017/0310483 A1* | 10/2017 | Nagao | G06F 21/44 |
| 2018/0178797 A1* | 6/2018 | Seaman | G07C 5/008 |
| 2020/0273268 A1* | 8/2020 | Bhattacharyya | G06Q 10/06315 |
| 2021/0184471 A1* | 6/2021 | Harper | H02J 13/00022 |

FOREIGN PATENT DOCUMENTS

| | | |
|---|---|---|
| JP | 2010124644 A | 6/2010 |
| JP | 2011166884 A | 8/2011 |
| JP | 2013027210 A | 2/2013 |
| WO | 2012015508 A1 | 2/2012 |
| WO | 2014122929 A1 | 8/2014 |

OTHER PUBLICATIONS

Labastida, Roberto Rodriguez, et al., "Distributed Renewables Monitoring and Forecasting Technologies", Navigant Research, Research Report, Published 2Q 2017, 49 pages.

Robitzky, Lena, et al., "Agent-Based Redispatch for Real-Time Overload Relief in Electrical Transmission Systems", 2015 IEEE Power & Energy Society General Meeting, Jul. 26-20, 2015, 5 pages.

Linnenberg, Tobias, et al., "A Market-Based Multi-Agent-System for Decentralized Power and Grid Control", International Conference on Emerging Technologies and Factory Automation (ETFA) 2011, Sep. 5-9, 2011, 8 pages.

Japan Patent Office, Notice of Reasons for Refusal issued in Japanese Patent Application No. 2021-500035, dated Mar. 14, 2022, total 12 pages.

European Patent Office, Extended European Search Report issued in Application No. EP 19831552.5, dated Feb. 24, 2022, 8 pages.

* cited by examiner

TECHNOLOGIES FOR OPTIMIZING POWER GRIDS THROUGH DECENTRALIZED FORECASTING

CROSS-REFERENCE TO RELATED APPLICATIONS

This application is a national stage application of International Application No. PCT/US2019/040719, filed on Jul. 5, 2019, which application claims priority to Provisional Application No. 62/694,431, filed on Jul. 5, 2018, which applications are hereby incorporated herein by reference.

TECHNICAL FIELD

The present disclosure relates to systems and methods for decentralized forecasting to optimize power grid operation.

BACKGROUND

Traditional transmission grid operation takes a centralized approach. Measurements from the power grid are gathered and transmitted to a central control. The central control processes the data and formulates a plan on how optimize power production. The central control will then transmit instructions to all the power grid components in order to implement the plan.

However, the increasing complexity and scale of power grids have made the traditional approach no longer feasible. The rise of Distributed Energy Resources (DERs), such as solar panels and wind turbines, has increased the erratic nature of power grids due to the unreliability of these energy sources. Today's power grids need sub-minute control and optimizations, and the latencies associated with a centralized approach do not allow for such precision. The traditional techniques are impossible to implement with the scale of today's transmission grid systems.

SUMMARY

According to one aspect of the present disclosure, a power grid may comprise a plurality of power grid components and a plurality of compute devices each associated with one of the plurality of power grid components. Each of the plurality of compute devices may be configured to (i) obtain measurements of one or more conditions of the associated power grid component, (ii) forecast a future state of the one or more conditions of the associated power grid component, and (iii) wirelessly communicate with other compute devices of the plurality of compute devices to negotiate a behavior of the associated power grid component using the forecast.

In some embodiments, each of the plurality of compute devices may be communicatively coupled to one of the plurality of power grid components.

In some embodiments, each of the plurality of compute devices may be integrated with one of the plurality of power grid components.

In some embodiments, the power grid may further comprise a plurality of sensors coupled to the plurality of power grid components. To obtain measurements of the one or more conditions of the associated power grid component may comprise to receive measurements of the one or more conditions from one or more of the plurality of sensors.

In some embodiments, the plurality of sensors may comprise one or more of voltage sensors, current sensors, temperature sensors, wind speed sensors, and humidity sensors.

In some embodiments, to obtain measurements of the one or more conditions of the associated power grid component may comprise to measure power consumption of the associated power grid component.

In some embodiments, to obtain measurements of the one or more conditions of the associated power grid component may comprise to measure power generation of the associated power grid component.

In some embodiments, to obtain measurements of the one or more conditions of the associated power grid component may comprise to measure one or more local weather conditions.

In some embodiments, each of the plurality of compute devices may be further configured to receive measurements of one or more conditions of other power grid components from other compute devices of the plurality of compute devices.

In some embodiments, the received measurements may comprise at least one of power consumption data, power generation data, and local weather data for the other power grid components.

In some embodiments, the future state of the one or more conditions of the power grid component forecast by each compute device may be between 1 and 60 minutes into the future.

In some embodiments, the future state of the one or more conditions of the power grid component forecast by each compute device may be less than one minute into the future.

In some embodiments, to forecast the future state of the one or more conditions may comprise employing a time series forecasting technique.

In some embodiments, each forecast of the future state of the one or more conditions may be based on the measurements of the one or more conditions for the associated power grid component.

In some embodiments, each forecast of the future state of the one or more conditions may be further based on the received measurements of the one or more conditions of the other power grid components.

In some embodiments, each forecast of the future state of the one or more conditions may be further based on historical data relating to the one or more conditions.

In some embodiments, to negotiate the behavior of the associated power grid component using the forecast may comprise to locally optimize a subsection of the power grid comprising the plurality of power grid components.

In some embodiments, to locally optimize the subsection of the power grid may comprise to maximize total power production from the plurality of power grid components.

In some embodiments, to locally optimize the subsection of the power grid may comprise to minimize total energy cost associated with the plurality of power grid components.

In some embodiments, to locally optimize the subsection of the power grid may comprise to minimize total energy loss associated with the plurality of power grid components.

In some embodiments, to locally optimize the subsection of the power grid may comprise to maximize availability of the plurality of power grid components.

In some embodiments, the plurality of compute devices may be configured to negotiate with one another using one or more machine learning techniques.

In some embodiments, the one or more machine learning techniques may comprise a plurality of autonomous agents, each of the plurality of autonomous agents being executed by one of the plurality of compute devices.

In some embodiments, the plurality of autonomous agents may negotiate with one another in a virtual market place according to a trading algorithm.

In some embodiments, the one or more machine learning techniques may comprise a plurality of neural networks, each of the plurality of neural networks being executed by one of the plurality of compute devices.

In some embodiments, each of the plurality of neural networks may comprise one of a feedforward neural network, a radial basis function neural network, a kohonen self-organizing neural network, a recurrent neural network, a modular neural networks, and a physical neural network.

In some embodiments, at least some of the plurality of power grid components may be distributed energy resources.

In some embodiments, the distributed energy resources may supply power to the power grid from one or more renewable energy sources.

In some embodiments, the distributed energy resources may comprise at least one of a solar panel array, a wind turbine, a hydroelectric power plant, a biomass power plant, a geothermal power plant, and a hydrogen fuel cell power plant.

In some embodiments, one of the plurality of power grid components may be a distribution substation that electrically connects the remaining power grid components of the plurality of power grid components.

In some embodiments, the distribution substation may comprise one or more voltage transformers.

In some embodiments, the power grid may further comprise a central control configured to provide one or more constraints to the plurality of compute devices.

In some embodiments, the one or more constraints may include at least one of a power constraint, an economic constraint, a weather constraint, and a time constraint.

In some embodiments, to negotiate the behavior of the associated power grid component may comprise to negotiate the behavior based upon the one or more constraints received from the central control.

In some embodiments, the central control is not configured to set the behaviors of the plurality of power grid components.

In some embodiments, the central control may be further configured to provide one or more override commands to one or more of the plurality of compute devices.

In some embodiments, the one or more override commands may include at least one of a command to reduce power consumption of the associated power grid component, a command to disconnect the associated power grid component from the power grid, and a command to halt the negotiation of the behavior of the associated power grid component.

According to another aspect of the present disclosure, a method may comprise obtaining, by a compute device, measurements of one or more conditions of a power grid component associated with the compute device; forecasting, by the compute device, a future state of the one or more conditions of the power grid component associated with the compute device; and wirelessly communicating, by the compute device, with other compute devices associated with other power grid components to negotiate a behavior of the power grid component associated with the compute device using the forecast.

In some embodiments, each compute devices may be communicatively coupled to its associated power grid component.

In some embodiments, each compute devices may be integrated with its associated power grid component.

In some embodiments, obtaining measurements of the one or more conditions of the associated power grid component may comprise receiving the measurements from one or more sensors affixed to the associated power grid component.

In some embodiments, the one or more sensors may comprise at least one of a voltage sensor, a current sensor, a temperature sensor, a wind speed sensor, and a humidity sensor.

In some embodiments, obtaining measurements of the one or more conditions of the associated power grid component may comprise obtaining measurements of power consumption of the associated power grid component.

In some embodiments, obtaining measurements of the one or more conditions of the associated power grid component may comprise obtaining measurements of power generation of the associated power grid component.

In some embodiments, obtaining measurements of the one or more conditions of the associated power grid component may comprise obtaining measurements of one or more local weather conditions.

In some embodiments, the method may further comprise receiving, by the compute device, measurements of one or more conditions of the other power grid components from the other compute devices.

In some embodiments, the received measurements may comprise at least one of power consumption data, power generation data, and local weather data for the other power grid components.

In some embodiments, the future state of the one or more conditions of the power grid component forecast by the compute device may be between 1 and 60 minutes into the future.

In some embodiments, the future state of the one or more conditions of the power grid component forecast by the compute device may be less than one minute into the future.

In some embodiments, forecasting the future state of the one or more conditions may comprise employing time series forecasting.

In some embodiments, the forecast of the future state of the one or more conditions may be based on the obtained measurements of the one or more conditions for the associated power grid component.

In some embodiments, the forecast of the future state of the one or more conditions may be further based on received measurements of one or more conditions of the other power grid components.

In some embodiments, the forecast of the future state of the one or more conditions may be further based on historical data relating to the one or more conditions.

In some embodiments, the method may further comprise retrieving the historical data from a database maintained by the compute device.

In some embodiments, to negotiate the behavior of the associated power grid component using the forecast may comprise to locally optimize a subsection of a power grid comprising the associated power grid component and the other power grid components.

In some embodiments, to locally optimize the subsection of the power grid may comprise to maximize total power production from the associated power grid component and the other power grid components.

In some embodiments, to locally optimize the subsection of the power grid may comprise to minimize total energy cost associated with the associated power grid component and the other power grid components.

In some embodiments, to locally optimize the subsection of the power grid may comprise to minimize total energy loss associated with the associated power grid component and the other power grid components.

In some embodiments, to locally optimize the subsection of the power grid may comprise to maximize availability of the associated power grid component and the other power grid components.

In some embodiments, to negotiate the behavior of the associated power grid component may comprise executing an autonomous agent, by the compute device, to cause the autonomous agent to negotiate with other autonomous agents, executed by the other compute devices, in a virtual market place according to a trading algorithm.

In some embodiments, to negotiate the behavior of the associated power grid component using the forecast may comprise executing a neural network by the compute device.

In some embodiments, the neural network may comprise one of a feedforward neural network, a radial basis function neural network, a kohonen self-organizing neural network, a recurrent neural network, a modular neural networks, and a physical neural network.

In some embodiments, the associated power grid component may be a distributed energy resource.

In some embodiments, the distributed energy resource may supply power to a power grid from a renewable energy source.

In some embodiments, the distributed energy resource may comprise at least one of a solar panel array, a wind turbine, a hydroelectric power plant, a biomass power plant, a geothermal power plant, and a hydrogen fuel cell power plant.

In some embodiments, the associated power grid component may be a distribution substation that is electrically connected to the other power grid components.

In some embodiments, the distribution substation may comprise one or more voltage transformers.

In some embodiments, the method may further comprise receiving, by the compute device, one or more constraints from a central control.

In some embodiments, the one or more constraints may include at least one of a power constraint, an economic constraint, a weather constraint, and a time constraint.

In some embodiments, to negotiate the behavior of the associated power grid component may comprise to negotiate the behavior based upon the one or more constraints received from the central control.

In some embodiments, the method may further comprise receiving, by the compute device, an override command from the central control and executing, by the compute device, the override command.

In some embodiments, the override command may be one of a command to reduce power consumption of the associated power grid component, a command to disconnect the associated power grid component from the power grid, and a command to halt the negotiation of the behavior of the associated power grid component.

In some embodiments, wirelessly communicating with the other compute devices associated with the other power grid components may comprise wirelessly communicating with a first subset of the other compute devices to negotiate with the first subset of the other compute devices.

In some embodiments, wirelessly communicating with the other compute devices associated with the other power grid components may further comprise wirelessly communicating with a second subset of the other compute devices, subsequent to wireless communicating with the first subset of the other compute devices, to negotiate with the second subset of the other compute devices.

In some embodiments, the compute devices may wirelessly communicate with the second subset of the other compute devices in response to negotiations with the first subset of the other compute devices not satisfying an optimization strategy of the compute device.

In some embodiments, the second subset of the other compute devices may be geographically farther away from the compute device than the first subset of the other compute devices.

According to yet another aspect of the present disclosure, one or more machine-readable media may store a plurality of instructions that, when executed by a compute device, cause the compute device to perform any of the methods described above (or elsewhere in the present disclosure).

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a compute device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The presently disclosed systems and methods allow for the optimization of an electrical grid without relying on a central control to perform calculations. In particular, the present disclosed systems and methods allow for decentralized forecasting and localized optimization. Each component in the electrical grid may be equipped with a compute device. The compute device allows each component to determine its own forecast and communicate with other components having such capabilities. The components may "negotiate" with one another using various machine learning techniques in order to locally optimize that section of the power grid. Decentralizing the forecasting and optimization processes decreases latencies and cost of the power grid system. As used in the present disclosure, "optimize," "optimization," and similar terms are not intended to require that a truly optimal state be achieved or even sought; rather, such terms are intended to convey any level of relative improvement of (or even an attempt to improve) the condition or state being "optimized."

Figure 1:
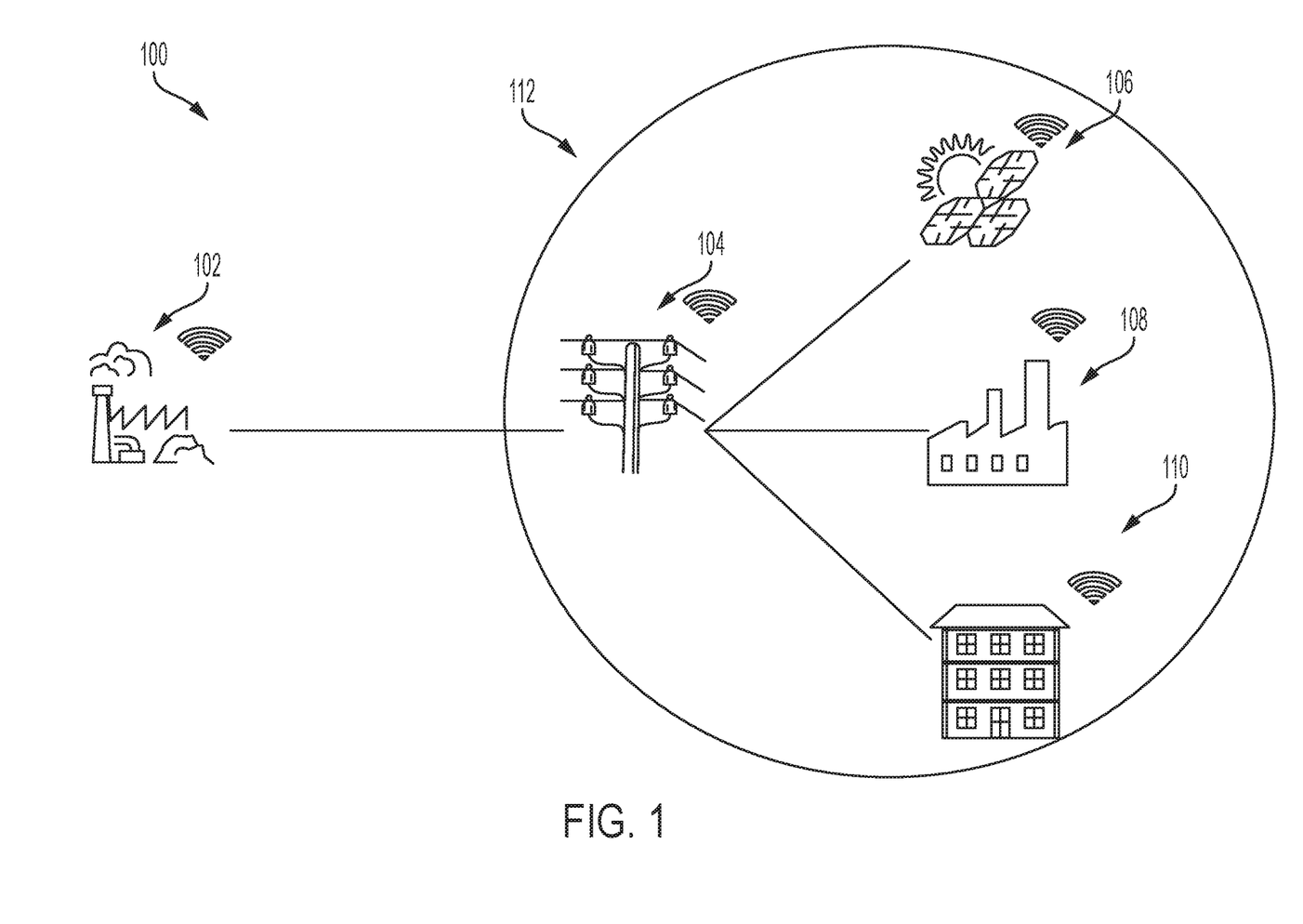
FIG. 1 is a simplified diagram of a decentralized power grid.

Referring now to FIG. 1, one illustrative embodiment of a decentralized power grid 100 is shown as a simplified diagram. The power grid 100 includes a central control 102, a distribution substation 104, a distributed energy resource ("DER") 106, an industrial load 108, a residential load 110. The distribution substation 104, DER 106, industrial load 108, and residential load 110 are located together in a subsection 112 of the power grid 100. Each of the central control 102, distribution substation 104, DER 106, industrial load 108, and residential load 110 are electrically connected to one another. Additionally, each of the power grid components in FIG. 1 comprises a compute device 200 that is communicatively coupled to other compute devices 200 of the power grid 100. The compute devices 200 associated with the power grid components 104, 106, 108, 110 of the subsection 112 may negotiate with the one another in order to optimize the subsection 112. In some embodiments, the power grid components negotiate using machine learning techniques in order to increase the efficiency of the subsection 112 and the optimization process.

The central control 102 may be embodied as any power grid component capable of fulfilling the functions described herein. In this illustrative embodiment, the central control 102 is responsible for the maintenance of the decentralized power grid 100. The central control 102 provides constraints to the distribution substation 104, the DER 106, the industrial load 108, and the residential load 110. In some embodiments, the constraints may be power related, economics related, weather related, time related, or related to any other factor that may affect the power delivered over decentralized power grid 100. The central control 102 may also issue override commands to any of the distribution substation 104, DER 106, industrial load 108, or residential load 110. In some embodiments, the override commands may be to reduce power consumption, to remove itself from the power grid, to halt the optimization process, or any other command necessary in order to maintain the decentralized power grid 100. In some embodiments, the central control 102 may exchange data with at least one of the other power grid components in FIG. 1. The data may include weather readings, power consumption records, historical data, negotiation results, or any other data related to the power grid 100. In some embodiments, the central control may be a power station, such as a coal power station, a nuclear power station, a wind farm, or any other station capable of producing electrical power.

The distribution substation 104 may be embodied as any power grid component capable of fulfilling the functions described herein. The distribution substation 104 electrically connects each of the power grid components in subsection 112 to the central control 102 and the rest of the decentralized power grid 100. In some embodiments, the distribution substation 104 includes one or more transformers. The distribution substation 104 comprises a compute device 200. The distribution substation 104 may gather data related to its power consumption. In some embodiments, the distribution substation 104 may gather local weather data. In some embodiments, the distribution substation 104 may gather data related to the power consumption and power generation of each of the power grid components located in the subsection 112. The distribution substation 104 is communicatively coupled with the central control and each of the power grid components in the subsection 112. The distribution substation 104 may negotiate with at least one of the power grid components in the subsection 112. In some embodiments, the distribution substation may negotiate using a machine learning technique, such as a neural network or an autonomous agent. The distribution substation 104 may negotiate with the other power grid components in order to optimize the subsection 112. In some embodiments, the distribution substation 104 may negotiate with power grid components outside the subsection 112. In some embodiments, the distribution substation 104 may negotiate with power grid components based on constraints received from the central control 102. In some embodiments, the distribution substation may exchange data with the central control 102. The data may include weather readings, power consumption records, historical data, negotiation results, or any other data related to the distribution substation 104. In some embodiments, the distribution substation 104 may receive override commands from the central control 102. In some embodiments, the override commands may be to reduce power consumption, to remove itself from the power grid, to halt the optimization process or any other command necessary in order to maintain the decentralized power grid 100.

The DER 106 may be embodied as any power grid component capable of fulfilling the functions described herein. The DER 106 produces electricity and is electrically connected to each of the power grid components in a subsection 112. The DER 106 may be embodied as a solar panel array, a wind turbine, a hydroelectric power plant, a biomass power plant, a geothermal power plant, a hydrogen fuel cell power plant, or any other station that produces power from a renewable energy source. In some embodiments, the DER 106 produces power using a non-renewable energy source, such as oil, coal or natural gas. The DER 106 comprises a compute device 200. The DER 106 may gather data related to its power consumption and its power production. In some embodiments, the DER 106 may gather local weather data. In some embodiments, the DER 106 may gather data related to the power consumption and power generation of each of the power grid components located in the subsection 112. The DER 106 is communicatively coupled with the central control and each of the power grid components in the subsection 112. The DER 106 may negotiate with at least one of the power grid components in the subsection 112. In some embodiments, the distribution substation may negotiate using a machine learning technique, such as a neural network or an autonomous agent. The DER 106 may negotiate with the other power grid components in order to optimize the subsection 112. In some embodiments, the DER 106 may negotiate with power grid components outside the subsection 112. In some embodiments, the DER 106 may negotiate with power grid components based on constraints received from the central control 102. In some embodiments, the distribution substation may exchange data with the central control 102. The data may include weather readings, power consumption records, historical data, negotiation results, or any other data related to the DER 106. In some embodiments, the DER 106 may receive override commands from the central control 102. In some embodiments, the override commands may be to reduce power consumption, to remove itself from the power grid, to halt the optimization process or any other command necessary in order to maintain the decentralized power grid 100.

The industrial load 108 may be embodied as any power grid component capable of fulfilling the functions described herein. The industrial load 108 consumes electricity and is electrically connected to each of the power grid components in the subsection 112. The industrial load 108 may be embodied a factory, an office building, a retail store, a warehouse or any other type of commercial building. In some embodiments, the industrial load may include DERs, such as solar panels, wind turbines, or generators. The industrial load 108 comprises a compute device 200. The industrial load 108 may gather data related to its power consumption and/or its power production. In some embodiments, the industrial load 108 may gather local weather data. In some embodiments, the industrial load 108 may gather data related to the power consumption and power generation of each of the power grid components located in the subsection 112. The industrial load 108 is communicatively coupled with the central control and each of the power grid components in the subsection 112. The industrial load 108 may negotiate with at least one of the power grid components in the subsection 112. In some embodiments, the distribution substation may negotiate using a machine learning technique, such as a neural network or an autonomous agent. The industrial load 108 may negotiate with the other power grid components in order to optimize the subsection 112. In some embodiments, the industrial load 108 may negotiate with power grid components outside the subsection 112. In some embodiments, the industrial load 108 may negotiate with power grid components based on constraints received from the central control 102. In some embodiments, the distribution substation may exchange data with the central control 102. The data may include weather readings, power consumption records, historical data, negotiation results, or any other data related to the industrial load 108. In some embodiments, the industrial load 108 may receive override commands from the central control 102. In some embodiments, the override commands may be to reduce power consumption, to remove itself from the power grid, to halt the optimization process or any other command necessary in order to maintain the decentralized power grid 100.

The residential load 110 may be embodied as any power grid component capable of fulfilling the functions described herein. The residential load 110 consumes electricity and is electrically connected to each of the power grid components in the subsection 112. The residential load 110 may be embodied a single-family home, a condominium, a town house, or any other type of residential building. In some embodiments, the industrial load may include a DER such as solar panels, wind turbines, or other generators. The residential load 110 comprises a compute device 200. The residential load 110 may gather data related to its power consumption and its power production. In some embodiments, the residential load 110 may gather local weather data. In some embodiments, the residential load 110 may gather data related to the power consumption and power generation of each of the power grid components located in the subsection 112. The residential load 110 is communicatively coupled with the central control and each of the power grid components in the subsection 112. The residential load 110 may negotiate with at least one of the power grid components in the subsection 112. In some embodiments, the distribution substation may negotiate using a machine learning technique, such as a neural network or an autonomous agent. The residential load 110 may negotiate with the other power grid components in order to optimize the subsection 112. In some embodiments, the residential load 110 may negotiate with power grid components outside the subsection 112. In some embodiments, the residential load 110 may negotiate with power grid components based on constraints received from the central control 102. In some embodiments, the distribution substation may exchange data with the central control 102. The data may include weather readings, power consumption records, historical data, negotiation results, or any other data related to the residential load 110. In some embodiments, the residential load 110 may receive override commands from the central control 102. In some embodiments, the override commands may be to reduce power consumption, to remove itself from the power grid, to halt the optimization process or any other command necessary in order to maintain the decentralized power grid 100.

The subsection 112 may be embodied as any subsection of a power grid. In the illustrative embodiment, the subsection of the power grid 100 contains the distribution substation 104, the DER 106, the industrial load 108, and the residential load 110. In some embodiments, the subsection 112 may contain any combination of power stations, power transformers, transmission substations, distribution substations, DERs, distribution automation devices, commercial/industrial consumers, residential consumers, and any other power grid component. Each power grid component in subsection 112 may comprise a compute device 200. Each power grid component in subsection 112 may be electrically and communicatively coupled to each other. The power grid components within the subsection 112 may negotiate with each other. In some embodiments, the distribution substation may negotiate using a machine learning technique, such as a neural network or autonomous agents. The power grid components may negotiate in order to optimize the subsection 112.

Figure 2:
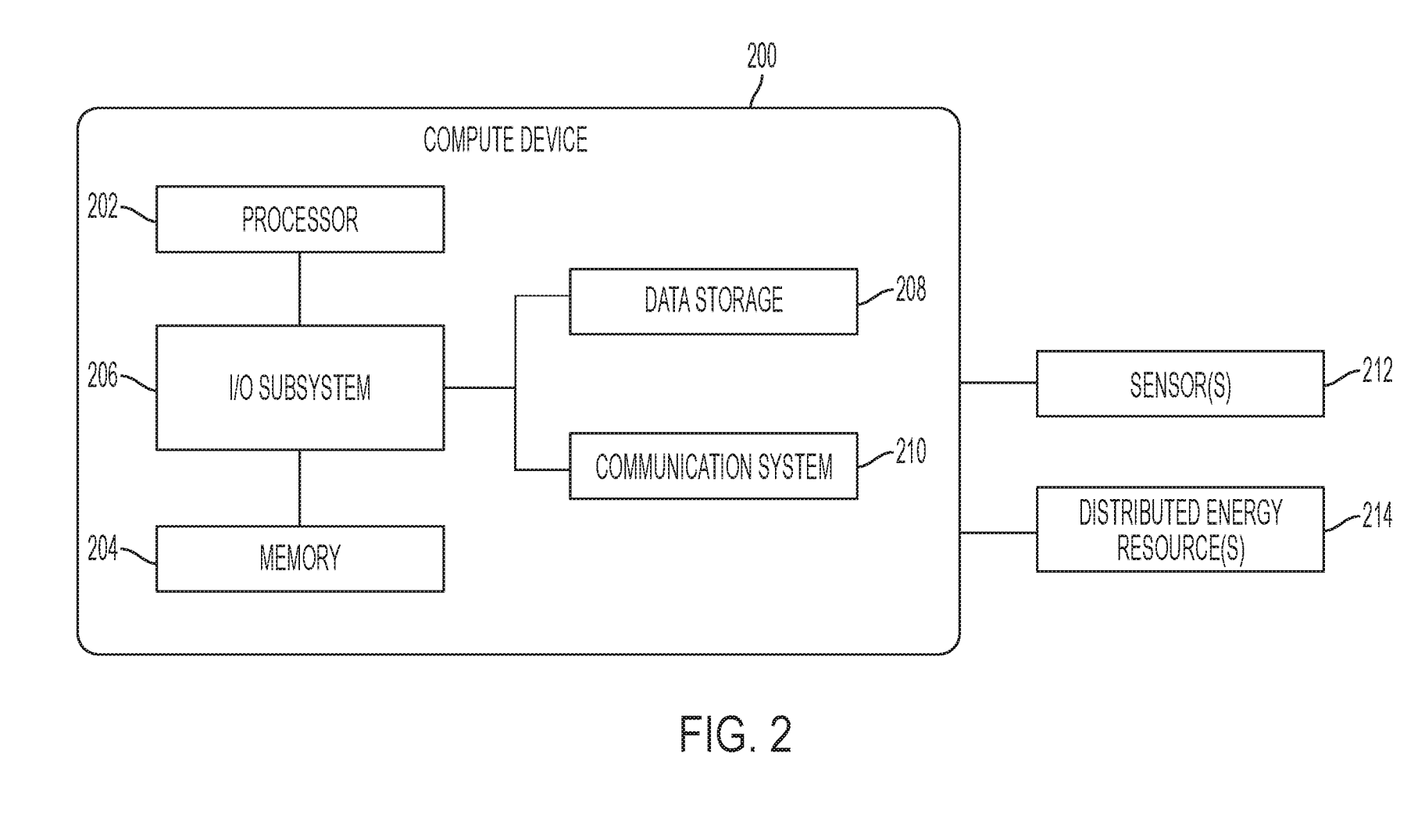
FIG. 2 is a simplified block diagram of at least one embodiment of a compute device attached to each power grid component of FIG. 1.

Referring now to FIG. 2, the compute device 200 may be embodied as any type of compute device capable of negotiating with other compute devices and performing the functions described herein. For example, the compute device 200 may be embodied as or otherwise be included in, without limitation, a raspberry pi, a tablet computer, a notebook computer, a laptop computer, an embedded computing system, a server computer, a System-on-a-Chip (SoC), a multiprocessor system, a processor-based system, a consumer electronic device, a smartphone, a cellular phone, a desktop computer, a network device, a networked computer, a wearable computer, a handset, a messaging device, a camera device, and/or any other compute device. The illustrative compute device 200 includes the processor 202, a memory 204, an input/output (I/O) subsystem 206, a data storage 208, and a communication system 210. The illustrative compute device 200 is connect to a sensor(s) 212 and a DER(s) 214. In some embodiments, one or more of the illustrative components of the compute device 200 may be incorporated in, or otherwise form a portion of, another component. For example, the memory 204, or portions thereof, may be incorporated in the processor 202 in some embodiments. In some embodiments, the sensor(s) 212 and DERs 214 may be included within the compute device 200.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 200 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 200. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 200 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The compute device 200 also includes the communication subsystem 210, which may be embodied as any communication circuit, device, or collection thereof, capable of enabling communications between the compute device 200 and other remote devices over a network. For example, the communication subsystem 210 may be embodied as or otherwise include a network interface controller (NIC) for sending and/or receiving network data with remote devices. The communication subsystem 210 may be configured to use any one or more communication technology (e.g., wired or wireless communications) and associated protocols (e.g., Ethernet, InfiniBand®, Bluetooth®, Wi-Fi®, WiMAX, 3G, 4G LTE, 5G, etc.) to effect such communication.

The sensors 212 may be embodied as any one or more sensors capable of generating one or more input signals that are indicative of power production of a power grid component, power consumption of a power grid component, and/or weather and temperature surrounding a power grid component, among other input signals. In the illustrative embodiment, the sensors 212 may include voltage sensors, current sensors, temperature sensors, wind speed sensors, humidity sensors. Additional sensors 212 may be included in order to perform the functions of the compute device below.

The DERs 106 may be embodied as any decentralized power supply which is electrically connected to the compute device 200. By way of illustrative example, DERs 106 may include solar panels, hydro systems, wind turbines, geothermal power systems, biomass power systems, diesel generators, and/or any other systems capable of producing and/or storing electrical power.

Figure 3:
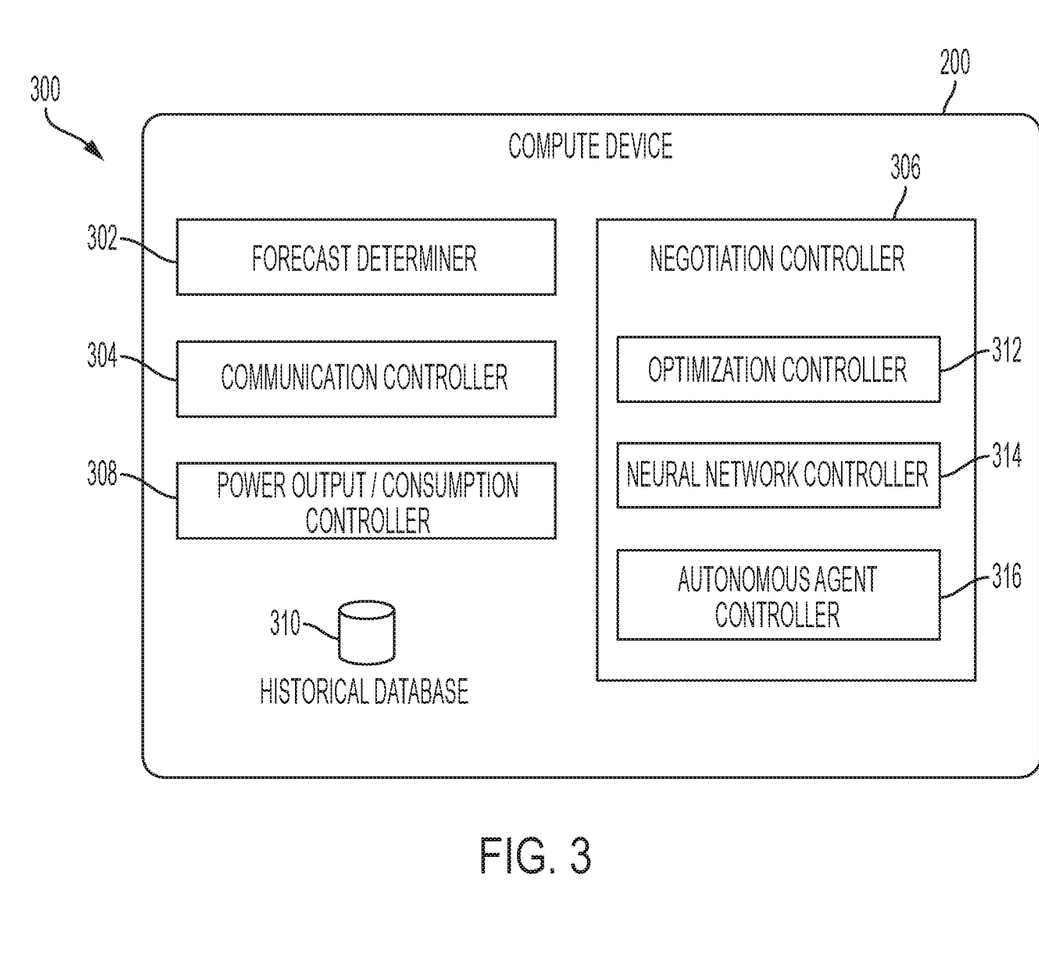
FIG. 3 is a block diagram of at least one embodiment of an environment that may be established by the compute device of FIG. 2.

Referring now to FIG. 3, in one illustrative embodiment, the compute device 200 establishes an environment 300 during operation. The illustrative environment 300 includes a forecast determiner 302, a communication controller 304, a negotiation controller 306, a power output/consumption controller 308, and a historical database 310. The various components of the environment 300 may be embodied as hardware, software, firmware, or a combination thereof. For example, the various components of the environment 300 may form a portion of, or otherwise be established by, the processor 202 or other hardware components of the compute device 200. As such, in some embodiments, one or more of the components of the environment 300 may be embodied as circuitry or collection of electrical devices (e.g., forecast determiner circuitry 302, communication controller circuitry 304, etc.). It should be appreciated that, in such embodiments, one or more of the circuits (e.g., forecast determiner circuitry 302, communication controller circuitry 304, etc.) may form a portion of one or more of the processor 202, the memory 204, the I/O subsystem 206, the communication system 210, the data storage 208, an application specific integrated circuit (ASIC), a programmable circuit such as a field-programmable gate array (FPGA), and/or other components of the compute device 200. For example, the negotiation controller 306 may be embodied as the processor 202 and associated instructions stored on the data storage 208 and/or the memory 204, which may be executed by the processor 202. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 202 or other components of the compute device 200. It should be appreciated that some of the functionality of one or more of the components of the environment 300 may require a hardware implementation, in which case embodiments of components which implement such functionality will be embodied at least partially as hardware.

The forecast determiner 302, which may be embodied as hardware, firmware, software, virtualized hardware, emulated architecture, and/or a combination thereof as discussed above, is configured to forecast the power production and consumption of the power grid component connected to the compute device 200. The forecast determiner 302 may determine the current power output and the current power consumption of the attached power grid component. The forecast determiner 302 may then retrieve data from the sensors 212. In some embodiments, the forecast determiner 302 may retrieve data related to the voltage levels, the current levels, and weather data, such as the temperature, the wind speed, and the humidity levels. In some embodiments, the forecast determiner 302 may receive weather data from the central control 102. In some embodiments, the forecast determiner 302 may download the weather prediction from another source. The forecast determine 302 may then determine the present day and time. In some embodiments, the forecast determined 302 may determine the present day and time by reading the internal calendar and clock of the compute device 200. The forecast determine 302 may then retrieve historical data from the historical database 310. The forecast determiner 302 may retrieve the historical data based in part on the current power production, the current power consumption, the retrieved sensor data, the weather, the present day, and the current time. The historical data may describe typical power output/consumption levels under similar constraints. In some embodiments, the historical data may define human behavior. The forecast determiner 302 may then determine a forecast based at least the historical data, the current power output, the current power consumption, the retrieved sensor data, the weather, the present day, and/or the current time. The forecast determiner 302 may determine the forecast for any period of time, including sub-minute, and using any appropriate forecasting technique. In some embodiments, the compute device 200 may determine the forecast for a period of time that is between 1 and 60 minutes into the future. In some embodiments, the forecast determiner 302 may employ a time series forecasting technique. The forecast determiner 302 may detect an abnormality. In some embodiments, the forecast determiner 302 may detect the abnormality using machine learning techniques. The forecast determiner 302 may address the abnormality In some embodiments the forecast determiner 302 may address the abnormality by adjusting the amount of power consumed or produced by the power grid component.

The communication controller 304, which may be embodied as hardware, firmware, software, virtualized hardware, emulated architecture, and/or a combination thereof as discussed above, is configured to establish a communication link with the other power grid components in the subsection 112. In some embodiments, the communication controller 304 may establish a communication link with power grid components outside of the subsection 112. In some embodiments, the communication channel will be established using the 5G communication protocol.

The negotiation controller 306 which may be embodied as hardware, firmware, software, virtualized hardware, emulated architecture, and/or a combination thereof as discussed above, is configured to negotiate with the other power grid components in the subsection 112. In some embodiments, the negotiation controller 306 negotiates with power grid components outside the subsection 112. The negotiation controller 306 will negotiate with the other power grid components in order to optimize the subsection 112. The negotiation controller 306 may include an optimization controller 312, a neural network controller 314, and/or an autonomous agent controller 316.

The optimization controller 312 is configured to control an optimization strategy. The optimization strategy defines how the subsection 112 should be optimized. In some embodiments, the optimization strategy may state that the power grid components in subsection 112 should be optimized in order to produce maximum power. In some embodiments, the optimization strategy may state that the power grid components in subsection 112 should be optimized in order to lower cost and energy loss. In some embodiments, the optimization strategy may state that the power grid components in subsection 112 should be optimized in order to maximize reliability, availability or resilience. In some embodiments, the optimization strategy may be adjusted based on pre-defined key performance indicators. The optimization controller 312 configures the optimization strategy based on the constraints received from central control. The optimization controller 312 may configure the optimization strategy based on the power production of the DER 214. In some embodiments, the optimization controller 312 may modify the optimization strategy based on the optimization strategy of other compute devices 200 in the subsection 112. Once the optimization controller 312 has defined the optimization strategy, the neural network controller 314 and the autonomous agent controller 316 will implement the optimization strategy when negotiating with other compute devices 200.

The neural network controller 314 is configured to negotiate with other compute devices 200 using a neural network. The neural network controller 314 may negotiate with the other compute devices using the optimization strategy in order to optimize the subsection 112. The neural network may be embodied as a feedforward neural network, radial basis function neural network, kohonen self-organizing neural network, recurrent neural network, modular neural networks, physical neural network, or any other type of neural network. The neural network controller 314 may contain a network trainer. The network trainer is configured to train the neural network with a training algorithm. The training algorithm is configured with one or more configuration parameters. In some embodiments, the configuration parameters are based on the historical data. In some embodiments, the configuration parameters are based on the constraints received from central control 102. The network trainer is further configured to capture a time series of partial accuracy values in response to training the neural network. Each partial accuracy value is indicative of neural network accuracy at an associated training iteration. The network trainer may be further configured to train the neural network with multiple, parallel instances of the training algorithm. Each parallel instance of the training algorithm is configured with a different set of one or more configuration parameters. The network trainer may be further configured to capture a time series of partial accuracy values for each parallel instance of the training algorithm. In some embodiments, the network trainer may be further configured to train the neural network with the training algorithm in parallel by a plurality of distributed computing nodes. The training algorithm of each computing node is configured with a different set of one or more configuration parameters.

The autonomous agent controller 316 is configured to negotiate with other compute devices using an autonomous agent. The autonomous agent may negotiate with the other compute devices using the optimization strategy in order to optimize the subsection 112. The autonomous agent will represent the compute device 200, along with its power grid component, on a virtual market place. The autonomous agent will "trade" its surplus or missing energy with the agents of other compute devices 200 in the subsection 112. The autonomous agent will "trade" according to a trading algorithm. In some embodiments, the trading algorithm will be based on the need(s) of the power grid component connected to compute device 200. In some embodiments, the trading algorithm will be based on the optimization strategy.

The power output/consumption controller 308, which may be embodied as hardware, firmware, software, virtualized hardware, emulated architecture, and/or a combination thereof as discussed above, is configured to adjust the power consumption and/or power production of the power grid component based on the negotiation results. For example the power output/consumption controller 308 may remove the DER 214 from the subsection 112 or the power output/consumption controller 308 may reduce the energy consumption of the power grid component. In some embodiments, the power output/consumption controller 308 may receive an override command from central control 102 and act upon the command. For example, the power output/consumption controller 308 may receive a command to disconnect the DER 214 from the power grid when the subsection 112 has been damaged.

The historical database 310, which may be embodied as hardware, firmware, software, virtualized hardware, emulated architecture, and/or a combination thereof as discussed above, is configured to store historical data. The historical data may include power production and power consumption records under various conditions, such as weather and time of day. In some embodiments, the historical data may include previous optimization strategies. The historical database 310 may include the historical data received from central control 102 or from other compute devices 200.

Figure 4:
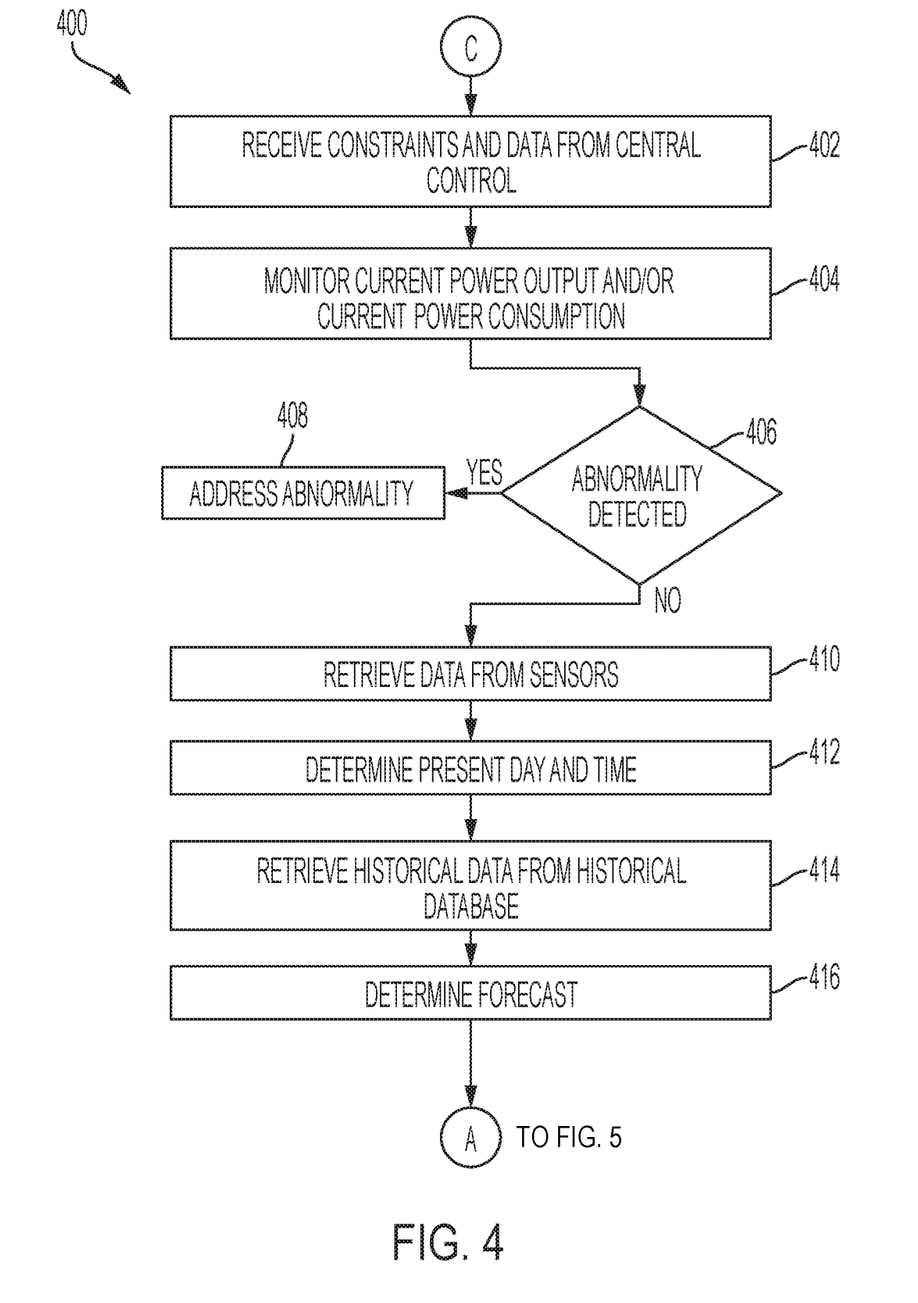
FIGS. 4-6 are a simplified flow diagram of at least one embodiment of a method for optimizing the operation of the power grid of FIG. 1 using the compute device of FIG. 2 that may be executed by the compute device of FIG. 2.
Figure 5:
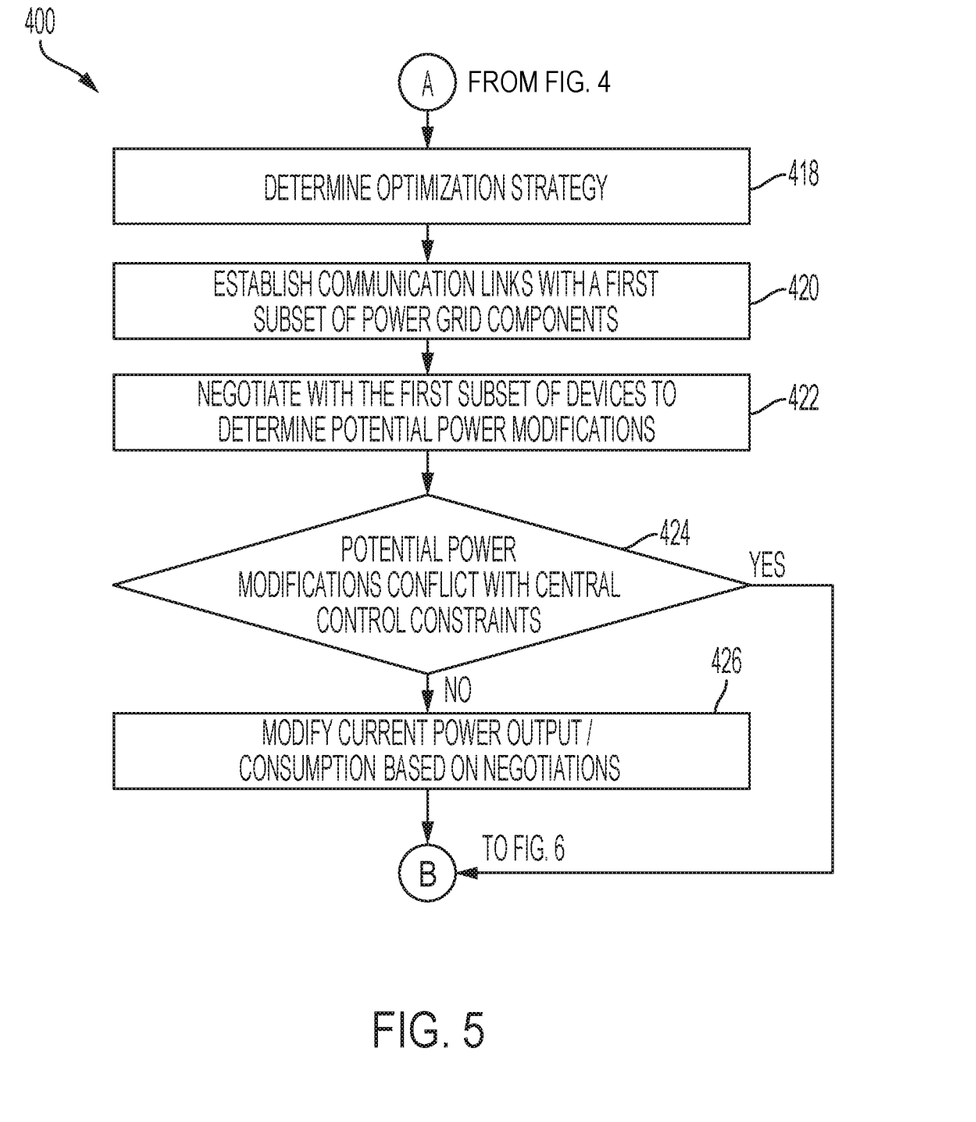
Figure 6:
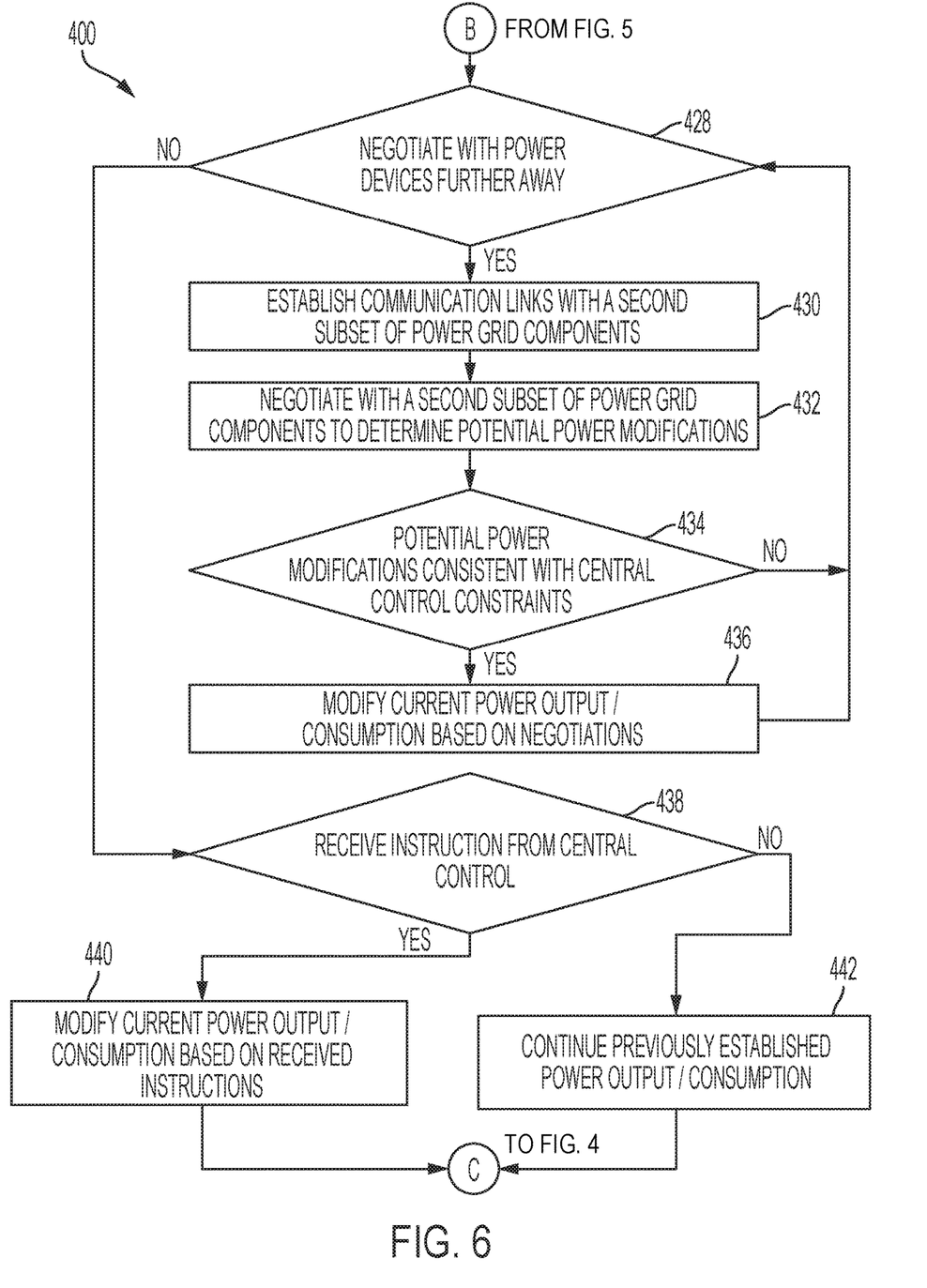

Referring now to FIGS. 4-6, in use, the compute device 200 may execute a method 400 for optimizing the subsection 112. The method 400 begins in block 402, in which the compute device 200 receives constraints and data from central control. The received constraints may dictate how the subsection 112 should be optimized. For example, the received constraints may dictate that the subsection 112 should keep operational costs at low as possible. Or the received constraints may dictate that the subsection 112 should maximize power production. In some embodiments, the received data contains weather data for the subsection 112. In some embodiments, the received data contains historical data to be stored in the historical database 310.

In block 404, the compute device 200 monitors the current power output and/or the current power consumption of the power grid component associated with the compute device 200. The power output may be generated by the DER 214. The DER 214 may be embodied as solar panels, hydro systems, wind turbines, geothermal power systems, biomass power systems, diesel generators, and/or any other systems capable of producing and/or storing electrical power. In some embodiments, the compute device 200 may monitor the current power output and/or the current power consumption of other power grid components. For example, the distribution substation 104 may monitor the current power output and the current power consumption of the DER 106, industrial load 108, and residential load 110.

In block 406, the compute device 200 may determine if an abnormality is detected. The compute device 200 may detect the abnormality using machine learning techniques. If the compute device 200 detects an abnormality, then the method advances to block 408. In block 408, the compute device 200 addresses the abnormality. In some embodiments the compute device address the abnormality by adjusting the amount of power consumed or produced by the power grid component. If the compute device 200 does not detect an abnormality, then the method advances to block 410.

In block 410, the compute device 200 may retrieve data from the sensors 212. The data may be indicative of voltage, current, temperature, wind speed, humidity level or any other constraint related to an electric grid.

In block 412, the compute device 200 may determine the present day and time. In some embodiments, the compute device 200 may determine the present day and time by reading its internal calendar and clock.

In block 414, the compute device 200 may retrieve historical data from the historical database 310. The compute device 200 may retrieve the historical data based in part on the current power production, the current power consumption, the retrieved sensor data, the weather, the present day, and the current time. The historical data may describe typical power output/consumption levels of the power grid component under similar constraints. In some embodiments, the historical data may represent human behavior.

In block 416, the compute device 200 may determine a forecast for the power grid component. The compute device 200 may then determine a forecast based at least the historical data, the current power output, the current power consumption, the retrieved sensor data, the weather, the present day, and/or the current time. The compute device 200 may determine the forecast for any period of time, including sub-minute, and using any appropriate forecasting technique. In some embodiments, the compute device 200 may determine the forecast for a period of time that is between 1 and 60 minutes into the future. In some embodiments, the compute device 200 may employ a time series forecasting technique.

Referring now to FIG. 5, in block 418, the compute device 200 may determine an optimization strategy. The optimization strategy defines how the subsection should be optimized. In some embodiments, the optimization strategy may state that the power grid components in subsection should be optimized in order to produce maximum power. In some embodiments, the optimization strategy may state that the power grid components in subsection should be optimized in order to lower cost and energy loss. In some embodiments, the optimization strategy may state that the power grid components in subsection should be optimized in order to maximize reliability, availability or resilience. In some embodiments, the optimization strategy may be adjusted based on pre-defined key performance indicators. The compute device 200 configures the optimization strategy based on the constraints received from central control. The compute device 200 may configure the optimization strategy based on the power production of the DER 106. In some embodiments, the compute device 200 may modify the optimization strategy based on the optimization strategy of other compute devices 200 in the subsection 112.

In block 420, the compute device 200 may establish a communication link with a first subset of power grid components. The first subset of power grid components is defined as all power grid components within a first subset of the electrical grid. In some embodiments, the communication channel will be established using the 5G communication protocol.

In block 422, the compute device 200 begins negotiation with the first subset of power grid components. The compute device 200 negotiates with the first subset of power grid components in order to implement the optimization strategy. The negotiations may be implemented with a neural network, an autonomous agent, or any other negotiation method. The neural network may be embodied as a feedforward neural network, radial basis function neural network, kohonen self-organizing neural network, recurrent neural network, modular neural networks, physical neural network, or any other type of neural network. The negotiations will result in potential power modification that the compute device 200 may implement to the power grid component.

In block 424, the compute device 200 determines if the potential power modifications conflict with any constraints received from central control 102. If the potential power modifications do conflict with the central control 102 constraints, then the method 400 advances to block 428 of FIG. 6. If the potential power modifications do not conflict with central control constraints, then the method 400 advances to block 426.

In block 426, the compute device 200 implements the potential power modifications on the attached power grid component. In some embodiments, the compute device may remove the DER 214 from the first subsection electric grid. In some embodiments, the compute device 200 may reduce the energy consumption of the attached power grid component.

Referring now to FIG. 6, in block 428 the compute device 200 determines if it should begin the optimization process with power grid components further away. In some embodiments, the determination in block 428 may involve the compute device 200 evaluating whether it was able to successfully implement its optimization strategy by negotiating with the first subset of power grid components. If not, the compute device 200 may decide to negotiate with power grid components further away to attempt to implement its optimization strategy. In this case, the method 400 advances to block 430. If the compute device 200 decides to not negotiate with power grid components further away, then the method 400 advances to block 438.

In block 430, the compute device 200 established a communication link with a second subset of power grid components. The second subset of power grid components is defined by all power grid components within a second subset of the electrical grid. In some embodiments, the communication channel will be established using the 5G communication protocol.

In block 432, the compute device 200 begins negotiation with the second subset of power grid components. The compute device 200 negotiates with the second subset of power grid components in order to implement the optimization strategy. The negotiations may be implemented with a neural network, an autonomous agent or any other negotiation method. The neural network may be embodied as a feedforward neural network, radial basis function neural network, kohonen self-organizing neural network, recurrent neural network, modular neural networks, physical neural network, or any other type of neural network. The negotiations will result in potential power modification that the compute device 200 may implement to the power grid component In block 434, the compute device 200 determines if the potential power modification conflicts with any constraints received from central control 102. If the potential power modifications do conflict with the central control constraints then the method 400 advances to block 428. If the potential power modifications do not conflict with central control constraints, then the method 400 advances to block 436.

In block 436, the compute device 200 implements the potential power modifications on the attached power grid component. In some embodiments, the compute device may remove the DER 214 from the second subsection electric grid. In some embodiments, the compute device 200 may reduce the energy consumption of the attached power grid component. Then the method 400 advances back to block 428.

In block 438, the compute device 200 determines if it has received a command (e.g., an override command) from central control 102. If the compute device 200 has received a command from central control 102, then the method 400 advances to block 440. In block 440, the compute device 200 modifies the current power consumption and/or power output based on the received command In some embodiments, the commands may be to reduce power consumption, to remove itself from the power grid, to halt the optimization process or any other command necessary in order to maintain the subsection of the grid. Referring back to block 438, if the compute device 200 has not received a command from central control 102, then the method 400 advances to block 442. In block 442, the compute device 200 continues the previously established power consumption and/or power output. Then the method 400 advances back to block 402.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There exist a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A method comprising:
   obtaining, by a computer device, measurements of one or more conditions of a power grid component of a subsection of a decentralized power grid, the power grid component associated with the computer device;
   forecasting, by the computer device, a forecast of a future state of the one or more conditions of the power grid component;
   communicating, by the computer device, with other computer devices associated with other power grid components of the subsection of the decentralized power grid thereby negotiating a behavior of the power grid component using the forecast; and
   adjusting the behavior of the power grid component, by the computer, based on the negotiation with the other computer devices thereby locally optimizing the subsection of the decentralized power grid.

2. The method of claim 1, wherein communicating with the other computer devices comprises communicating wirelessly with the other computer devices.

3. The method of claim 1, wherein the computer device and the other computer devices is communicatively coupled to its associated power grid component or integrated with its associated power grid component.

4. The method of claim 1, wherein obtaining the measurements of the one or more conditions of the associated power grid component comprises receiving the measurements from one or more sensors affixed to the associated power grid component.

5. The method of claim 4, wherein the one or more sensors comprise one or more of a voltage sensor, a current sensor, a temperature sensor, a wind speed sensor, or a humidity sensor.

6. The method of claim 1, wherein obtaining the measurements of the one or more conditions of the associated power grid component comprises obtaining measurements of power consumption of the associated power grid component, power generation of the associated power grid component, or one or more local weather conditions.

7. The method of claim 1, further comprising receiving, by the computer device, measurements of one or more conditions of the other power grid components from the other computer devices.

8. The method of claim 7, wherein the received measurements comprise at least one of power consumption data, power generation data, and local weather data for the other power grid components.

9. The method of claim 1, wherein the forecast is a forecast of the future state of the one or more conditions of the power grid component between one and sixteen minutes into the future.

10. The method of claim 1, wherein forecasting the future state of the one or more conditions comprises employing time series forecasting.

11. The method of claim 1, wherein the forecast of the future state of the one or more conditions is based on the obtained measurements of the one or more conditions for the associated power grid component.

12. The method of claim 11, wherein the forecast of the future state of the one or more conditions is further based on received measurements of one or more conditions of the other power grid components.

13. The method of claim 11, wherein the forecast of the future state of the one or more conditions is further based on historical data relating to the one or more conditions.

14. The method of claim 13, further comprising retrieving the historical data from a database maintained by the computer device.

15. The method of claim 1, wherein locally optimizing the subsection of the power grid comprises maximizing total power production from the associated power grid component and the other power grid components, minimizing total energy cost associated with the associated power grid component and the other power grid components, minimizing total energy loss associated with the associated power grid component and the other power grid components, or maximizing availability of the associated power grid component and the other power grid components.

16. The method of claim 1, wherein negotiating the behavior of the associated power grid component comprises executing an autonomous agent, by the computer device, to cause the autonomous agent to negotiate with other autonomous agents, executed by the other computer devices, in a virtual market place according to a trading algorithm.

17. The method of claim 1, wherein negotiating the behavior of the associated power grid component using the forecast comprises executing a neural network by the computer device.

18. The method of claim 17, wherein the neural network comprises a feedforward neural network, a radial basis function neural network, a Kohonen self-organizing neural network, a recurrent neural network, a modular neural networks, or a physical neural network.

19. The method of claim 1, wherein the associated power grid component is a distributed energy resource.

20. The method of claim 19, wherein the distributed energy resource supplies power to a power grid from a renewable energy source or the distributed energy resource comprises a solar panel array, a wind turbine, a hydroelectric power plant, a biomass power plant, a geothermal power plant, or a hydrogen fuel cell power plant.

21. The method of claim 1, wherein the associated power grid component is a distribution substation that is electrically connected to the other power grid components.

22. The method of claim 21, wherein the distribution substation comprises one or more voltage transformers.

23. A non-transitory machine-readable media storing a plurality of instructions that, when executed by the computer device, cause the computer device to perform the method of claim 1.

24. A method comprising:
obtaining, by a computer device, measurements of one or more conditions of a power grid component of a subsection of a decentralized power grid, the power grid component associated with the computer device;
receiving, by the computer device, one or more constraints from a central control of the decentralized power grid;
forecasting, by the computer device, a forecast of a future state of the one or more conditions of the power grid component;
communicating, by the computer device, with other computer devices associated with other power grid components of the subsection of the decentralized power grid thereby negotiation a behavior of the power grid component using the forecast; and
adjusting the behavior of the power grid component, by the computer, based on the negotiation with the other computer devices thereby locally optimizing the subsection of the decentralized power grid.

25. The method of claim 24, wherein the one or more constraints include a power constraint, an economic constraint, a weather constraint, or a time constraint.

26. The method of claim 24, wherein negotiating the behavior of the associated power grid component comprises negotiating the behavior based upon the one or more constraints received from the central control.

27. The method of claim 24, further comprising:
receiving, by the computer device, an override command from the central control; and
executing, by the computer device, the override command.

28. The method of claim 27, wherein the override command comprises a command to reduce power consumption of the associated power grid component, a command to disconnect the associated power grid component from a power grid, or a command to halt the negotiation of the behavior of the associated power grid component.

29. A method for operating a computer device associated with a power grid component that is electrically connected to other power grid components that each are associated with another computer device, the power grid component and the other power grid components forming a subsection of a decentralized power grid, the method comprising:
obtaining measurements of one or more conditions of the power grid component;
forecasting a future state of the one or more conditions of the power grid component;

wirelessly communicating with a first subset of the other computer devices thereby negotiating a behavior of the power grid component using the forecast; and adjusting the behavior of the power grid component based on the negotiation with the other computer devices thereby locally optimizing the subsection of the decentralized power grid.

30. The method of claim 29, further comprising wirelessly communicating with a second subset of the other computer devices, subsequent to wireless communicating with the first subset of the other computer devices, to negotiate with the second subset of the other computer devices.

31. The method of claim 30, wherein the computer device wirelessly communicates with the second subset of the other computer devices in response to negotiations with the first subset of the other computer devices not satisfying an optimization strategy of the computer device.

32. The method of claim 30, wherein the second subset of the other computer devices are geographically farther away from the computer device than the first subset of the other computer devices.

\* \* \* \* \*